(12) United States Patent
Colico et al.

(10) Patent No.: US 8,581,142 B2
(45) Date of Patent: Nov. 12, 2013

US008581142B2

(54) METHOD AND APPARATUS FOR TRANSFERRING IMAGES TO A WOODEN SUPPORT WITH A LASER BEAM

(76) Inventors: Ettore Colico, Giussano (IT); Pierangelo Facchini, Gardone Val Trompia (IT)

( * ) Notice: Subject to any disclaimer, the term of this patent is extended or adjusted under 35 U.S.C. 154(b) by 736 days.

(21) Appl. No.: 10/579,922

(22) PCT Filed: Feb. 20, 2006

(86) PCT No.: PCT/IB2006/000338

§ 371 (c)(1), (2), (4) Date: Jul. 25, 2006

(87) PCT Pub. No.: WO2007/000629

PCT Pub. Date: Jan. 4, 2007

(65) Prior Publication Data

US 2007/0129841 A1 Jun. 7, 2007

(30) Foreign Application Priority Data

Jun. 27, 2005 (IT) .............................. MI2005A1208

(51) Int. Cl.
*B23K 26/00* (2006.01)

(52) U.S. Cl.
USPC ............. 219/121.68; 219/121.69; 219/121.61

(58) Field of Classification Search
USPC ................ 700/166; 156/64, 265; 219/121.61, 219/121.68, 121.69, 121.8, 121.67; 427/317, 554, 557, 596; 430/346, 945
See application file for complete search history.

(56) References Cited

U.S. PATENT DOCUMENTS

| | | | | |
|---|---|---|---|---|
| 3,829,791 | A * | 8/1974 | Schwartz | 372/25 |
| 4,315,379 | A * | 2/1982 | Lang | 42/71.02 |
| 4,847,184 | A | 7/1989 | Taniguchi et al. | |
| 4,885,752 | A | 12/1989 | Chien et al. | |
| 4,972,323 | A * | 11/1990 | Cauwet | 700/187 |
| 5,190,791 | A | 3/1993 | Günter et al. | |
| 5,567,207 | A | 10/1996 | Lockman et al. | |
| 5,719,372 | A * | 2/1998 | Togari et al. | 219/121.61 |
| 6,047,012 | A | 4/2000 | Nerin et al. | |
| 6,111,902 | A | 8/2000 | Kozlov et al. | |
| 6,160,835 | A * | 12/2000 | Kwon | 219/121.68 |
| 6,263,004 | B1 | 7/2001 | Arvidsson et al. | |
| 6,396,860 | B1 | 5/2002 | Kozlov et al. | |
| 6,489,985 | B1 * | 12/2002 | Brodsky et al. | 347/247 |
| 6,624,883 | B1 * | 9/2003 | Zhou et al. | 356/237.1 |
| 2002/0113829 | A1 * | 8/2002 | Nims et al. | 347/2 |
| 2005/0006357 | A1 | 1/2005 | Connor | |
| 2005/0083551 | A1 * | 4/2005 | McIlvaine | 358/1.18 |

FOREIGN PATENT DOCUMENTS

JP 2001205463 A * 7/2001

* cited by examiner

*Primary Examiner* — Henry Yuen
*Assistant Examiner* — Hung D Nguyen
(74) *Attorney, Agent, or Firm* — Nixon & Vanderhye P.C.

(57) ABSTRACT

An apparatus for transferring images to a wooden support includes a component for acquiring and/or creating an image, at least one source of a laser beam, and a component for moving, either in rotation and/or translation, the laser beam relative to the wooden support, or vice versa, as well as focusing the laser beam relative to the support. At least one adjustment unit is provided for the emission of the laser beam, and at least one control unit controls the moving and focusing components. The information of the image is converted to be transferred into instructions for the adjustment unit and control unit. The adjustment unit adjusts the emission of the laser beam by directly varying the pumping of the active material and/or by varying the operation of a modulator placed within the resonant cavity of the laser source.

10 Claims, 2 Drawing Sheets

METHOD AND APPARATUS FOR TRANSFERRING IMAGES TO A WOODEN SUPPORT WITH A LASER BEAM

FIELD OF THE INVENTION

The present invention relates to an apparatus and a method for transferring images to a wooden support by means of the controlled application of a laser beam.

PRIOR ART

Using a laser beam for marking, cutting or reproducing drawings on any support, such as paper, plastic, metal or wood has been known for some time. The most suitable wavelength of the laser beam can be established for any material being the support to be treated, i.e. the most suitable type of laser for the material being this support, as well as the emission power and the pulse frequency of the laser beam allowing to cut and reproduce the drawing as desired. Tables and relationship connecting the wavelength, type of laser (i.e. the type of active material, the pumping type for this active material, and the relative operating conditions), the emission power and the pulse frequency, as well as the material being the support to be processed by means of the laser beam are provided in the technical literature of the field.

Particularly, image transfer to a wooden support, such as a mirror frame or wardrobe door, is known to be advantageously carried out using laser with active material in the gaseous state, such as $CO_2$ lasers, or active material in the solid state, such as ionic crystals such as ruby or neodymium.

An image in digital format can be first converted in a set of operative instructions for operating the laser source and then transferred to the wooden support by modulating the power and pulse frequency emitted by the laser beam based on said operative instructions.

A simplified diagram of the method for transferring an image to a wooden support starting from the acquisition or creation of a digital image through a system called “Computer Aided Laser System”, is briefly described in US patent publication US-A1-2005/0006357.

In this publication no mention is made either to the type of laser that can be used for this image transfer, or to the operating modes for adjusting the laser beam in terms of power emission and pulse frequency, and moving and focusing the same relative to the wooden support, or vice versa.

Furthermore, in US patent application US-A1-2005/0006357 no mention is made of transferring images reproducing wood grains to wooden supports.

U.S. Pat. No. 4,847,184, granted in the name of Taniguchi teaches how to use a $CO_2$ laser source coupled to an acoustic-optical (or electro-optical) modulator, preferably based on germanium (or Cd—Te), which is located downstream of the source of laser beam, such that the latter is modulated on a wooden support, preferably pretreated with agents accelerating the carbonization and/or bleaching. In greater detail, the method as described in patent U.S. Pat. No. 4,847,184 provides a step of generating one or more images in shades of grey, pre-treating the wooden support by means of said additives, generating a laser beam and modulating the same with said acoustic-optical or electro-optical modulator external to the laser source, and then guiding this laser beam to the wooden support, in conformity with the graphic information of the previously created images.

Using a modulator, known per se, external to the laser source entails a certain difficulty in modulating the beam, and the impossibility of using high emission power, because of the type of modulator (either Ge- or Cd—Te-based) that must be employed in this type of apparatus.

This means that the apparatus described in U.S. Pat. No. 4,847,184, and the corresponding method of use, cannot ensure high precision in reproducing the image on the wooden support, nor can they allow high processing speeds and/or cutting depths on the latter.

Furthermore, U.S. Pat. No. 4,847,184 does not provide the use of a transmission system for the beam, such as to focus and move the latter on the wooden support, which is capable of following the complex three-dimensional contours of the latter, but provides only a beam transmission system capable of guiding and focusing the laser beam on flat or at most cylindrical surfaces.

Finally, the Taniguchi patent does not mention the possibility of transferring images of wood grains to wooden supports, nor the fact that the image is transferred as deep as several tenths of a millimeter under the surface.

An object of the present invention is thus to provide an apparatus for transferring images to a wooden support by means of a laser that does not suffer from the above-mentioned drawbacks, and therefore allows reproducing the images on this wooden support, as desired, with high precision, while allowing to achieve high processing speeds and/or great image transfer depths within the support.

Another object of the present invention is to provide an apparatus for transferring images to a wooden support by means of a laser, and an operating method therefor, which allows transferring images to supports having complex three-dimensional shapes, i.e. not only on flat surfaces or three-dimensional axial-symmetrical surfaces, but also on asymmetrical pieces, such as rifle butts (or stocks) or pistol grips.

Yet another object of the present invention is to provide a method for transferring images reproducing wood grains to a wooden support by means of a laser, which allows obtaining finished products of extremely natural appearance.

SUMMARY OF THE INVENTION

The apparatus for transferring images to a wooden support, according to the present invention, comprises means for acquiring and/or creating an image, at least one source of a laser beam, means for focusing and moving, rotatably and/or in translation, the laser beam relative to the wooden support, or vice versa, at least one adjustment unit for the laser beam emission, at least one control unit for said focusing and moving means, as well as means for converting the information of the image to be transferred into instructions for the adjustment unit for the laser beam emission and for the control unit for said focusing and moving means.

Advantageously, said laser beam adjustment unit is configured to adjust the emission of said laser beam by directly varying the pumping of the active material and/or varying the operation of a modulator located within the resonant cavity of said source of a laser beam.

Particularly, according to preferred aspects of the present invention, when a gas (such as CO or $CO_2$) laser source, is used as the laser source, said adjustment unit for the laser beam emission can directly adjust the radiofrequency pumping of the gas being the active material. Alternatively, when a laser with active material in the solid state is employed in the apparatus of the present invention, this adjustment unit can adjust a Q-Switch modulator that is placed directly within the resonant cavity of the laser source.

By controlling the active material pumping, or adjusting an intracavity modulator, the apparatus of the present invention can be extremely accurate in managing the intensity of the emitted beam, with consequent greater precision in reproducing images on the wooden support, mainly when these are in shades of grey, and much higher power can be used (up to 1500 W and more) for treating this wooden support.

Furthermore, by directly controlling the pumping, or an intracavity modulator, a sensible energy saving can be obtained as compared with known apparatus (particularly when using $CO_2$ lasers excited with electromagnetic field in the radio frequency regime, as is preferred).

In addition, according to a preferred aspect of the present invention, said means for focusing and moving, in rotation and/or translation, the laser beam relative to the wooden support can be of the type having a scan head with 2 or 3 axes. Thereby, a high precision in the focusing, i.e. in the adjustment of the focusing distance, and in the transmission, i.e. in the movement of the laser beam (or better the trace, or spot, thereof on the support being processed) relative to this wooden support can be obtained, such that the apparatus of the present invention can transfer images also on supports having three-dimensional, non symmetrical shapes.

According to another aspect of the present invention, a method is provided for transferring images to a wooden support by means of an apparatus provided with at least one source of a laser beam, means for focusing and moving the laser beam relative to this wooden support, as well as at least one adjustment unit for the emission of said laser beam, comprising the steps of:

- acquiring and/or creating an image to be transferred;
- converting the information of this image into instructions for adjusting the emission, movement and focusing of the laser beam relative to said support;
- operating the moving and focusing means and the adjustment unit for the laser beam according to the above-mentioned instructions, for reproducing the image on the wooden support.

The method of the present invention also provides that the adjustment unit controls the emission of the laser beam by directly adjusting the active material pumping and/or by adjusting a modulator arranged within the resonant cavity of the laser source.

In a particular implementation of the method according to the present invention, furthermore, the object of this method is to transfer images, preferably of the type with 16-256 shades of grey, reproducing wood grains to the wooden support, such that the grains reproduced have a natural appearance.

To this purpose, according to said particular implementation of the method according to the present invention, the Applicant has identified in an interval ranging between 2.35 $j/cm^2$ and 43.7 $j/cm^2$ the energy per surface unit to which a wooden support is to be locally subjected by means of a laser beam, to the purpose of blackening the same up to thicknesses of several tenths of millimeter, without carbonizing it or removing excess material therefrom.

According to another aspect of the method according to the present invention, the image to be transferred is, at least partially, generated in a random manner and is transferred to wooden parts of firearms, such as grips of guns or carbines, rifle butts or forearms and the like.

BRIEF DESCRIPTION OF THE DRAWINGS

A particular embodiment of the apparatus of the present invention and a peculiar implementation of an operating method of this apparatus will be described below by way of non-limiting example, with reference to the annexed drawings, in which.

DETAILED DESCRIPTION OF AN EMBODIMENT OF THE PRESENT INVENTION

Figure 1:
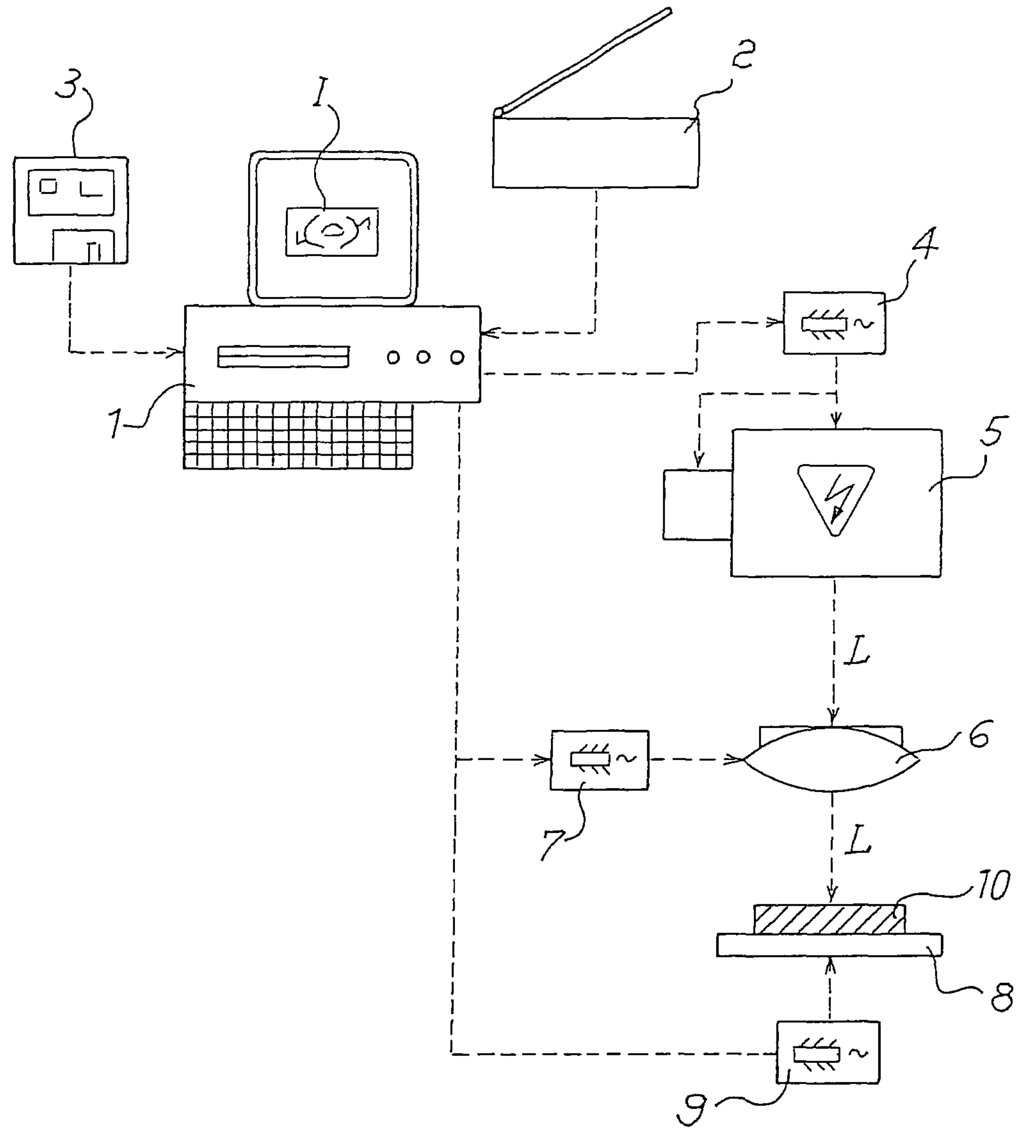
FIG. 1 is a functional diagram of the apparatus according to a preferred aspect of the present invention.

With reference to FIG. 1, the apparatus for transferring images to a wooden support 10, in a particular embodiment of the present invention, comprises means 1, 2, 3 for acquiring and/or creating an image 1, at least one source 5 of a laser beam L, means 6, 8 for focusing and directing the laser beam L on the wooden support 10 (or vice versa, for moving the wooden support 10 relative to the laser beam L), at least one adjustment unit 4 for the emission of the laser beam L, acting on the source 5 of the latter, and at least one unit 7, 9 for controlling said means 6, 8 for focusing and directing (or moving) the laser beam L.

It should be observed that by the wording "means for focusing and directing (or guiding, or moving) the laser beam on the support" is meant, here and below, to designate those means allowing to define the size, by means of the focusing, and the position, e.g. by means of optical fibers or motor-driven mirrors, or other optical means, or electro-optical means, known in the field, of the spot, i.e. the trace, of the laser beam L on the support 10 being processed.

The apparatus illustrated herein also comprises means 1 for converting the graphic information of the image I into a set of operative instructions both for said adjustment unit 4 for the laser beam L emission, and the control unit 7, 9 of the means 6, 8 for focusing and moving (or guiding) the laser beam L on the wooden support 10.

In the particular embodiment of the apparatus according to the invention as described herein, the means for acquiring and/or generating an image I can comprise a processor 1, optionally connected to an element for acquiring images 2 (scanner), provided with a software 3 for managing at least the image 1. In this case, the image I is managed and stored within the processor 1 in digital format, such as a bitmap, raster or directly vectorial image. Preferably, as will be seen below, this image I can be treated and stored such that a digital image is obtained, either in black and white or 16-256 shades of grey.

The software 3 managing the image I can either comprise any image editing program being adapted, for example, to edit any image that is digitalized by means of the scanner 3, or can comprise a CAD system for the extemporaneous creation of an image I, or it may be as well any program suitable to generate, also in a random or pseudo-random manner, any image I as desired by the operator.

When the apparatus described herein is used for transferring images I reproducing wood grains to a wooden support 10, according to a preferred aspect of the present invention, the software 3 will be capable of generating, in a random or pseudo-random manner, grain images starting from suitable primitives that have been set in the software 3 during the design step, or however, programmed before using the software 3.

In the embodiment illustrated herein of the apparatus according to the present invention, the processor 1 can be also provided with a further software 3, such as of CAE-CAM type, to convert the graphic information of the acquired image I into operative instructions for the apparatus 1.

These operative instructions, as is common with CAM systems, can be of the geometrical type, intended to control the direction of the laser beam L on the wooden support 10, and of the functional type, intended to adjust the intensity, pulse frequency and focusing of the laser beam L to the purpose of allowing the reproduction, optionally with tone shadings, of the image I on the wooden support 10.

In the particular apparatus described herein, the processor 1 acting in this case also as a CAE-CAM conversion means of the graphic information into operative instructions for the apparatus described herein, is operatively connected to an adjustment unit 4 for the laser source 5, to a control unit 7 for a system 6 for focusing and transferring, i.e. moving the laser beam L (or better, the spot thereof) in translation and rotation relative to the support 10, as well as to a control unit 9 of a piece-holder table 8 provided with a mechanism (not illustrated) for moving the table 8 and/or the support 10.

The laser source 5, according to the present invention, may be of any known type, but particularly, it may be of the type with gaseous active material, such as $CO_2$, CO, or of the type with solid material, such as crystals doped with neodymium, ytterbium, erbium, or with excimers with UV emissions. It should be observed that the use $CO_2$ and CO laser sources with pumping by means of electromagnetic field in the radio frequency regime (27-81 MHz) has proved to be sensibly favourable both for the wavelength of the laser beam (about 10 micron), resulting optimum for wood processing, and for the wide range of power and output values that can be obtained.

The laser source 5 of the apparatus illustrated herein is further advantageously governed by an adjustment unit 4 of the type capable of directly adjusting the pumping of the active material, if this is in the gaseous state, and/or adjusting a modulator, if provided, preferably of the Q-Switch type, directly contained in the resonant cavity of the laser source 5 when the active material is in the solid state.

The adjustment unit 4 is capable of adjusting both the power emitted from the laser beam L, and the pulse frequency of the latter, as a function of the particular process requirements for the wooden support 10.

By directly adjusting the pumping of the active material, or the intracavity modulation of the laser beam L, the emission power of the beam L can be more effectively controlled, and sensible energy saving is obtained as compared with prior art apparatus (mainly when $CO_2$/CO lasers are used, which is preferred).

Furthermore, this solution does not impose excessively low upper limits to the emission power, which can be as high as 1500 W and more.

Thereby, in contrast with the prior art, downstream of the laser source 5 there are not provided modulators external to the resonant cavity, but means 6 are directly provided for focusing and guiding the laser beam L on the wooden support 10.

Preferably, these means 6 are of the type having a scan head, i.e. means of the type with motor-driven mirrors and lenses for guiding the laser L, with 2 or 3 axes, which are already known in other industrial applications with laser beams.

The use of scan heads with 2 or 3 axes is particularly advantageous with the apparatus of the present invention, as supports 10 having complex three-dimensional surfaces can be treated with the laser beam L by maintaining high processing speeds (mainly when galvanometric motors are used for the scan heads) and great accuracy in positioning and focusing the beam L (or the spot thereof) on the support 10.

As is known in the art, the scan head 6 of the laser beam L can be controlled by a suitable control unit 7 capable of controlling the head 6 for directing the beam L precisely on the support 10 and for adjusting the focal distance of the beam L on the support 10. The control unit 7 is, in turn, suitably controlled, in the particular apparatus as depicted in FIG. 1 by the processor 1.

According to another aspect of the present invention, the apparatus can also comprise a piece-holder table 8, provided with actuators, such as mechanic or fluidic, intended to hold the wooden support 10 and operated in a controlled manner by a controlled unit 9, which is also functionally associated with the processor 1. The piece-holder 8 can be of the type provided with simple jaws for resting the support 10 thereon, or can be also provided with mandrel, faceplate (i.e. table) with jaws and tailstock (or center) to also allow the rotation of the support 10, which is cantilever-held relative to the scan head 6.

The actuators of the piece-holder table 8, such as capable of translating or rotating the wooden support 10 relative to the scan head 6 of the laser beam L, are governed by a conventional control unit 9, which is controlled, in turn, in the embodiment described herein by the processor 1.

It should be observed that, though a scan head 6 for focusing and guiding the laser beam L on the support 10 and a piece-holder table 8, either mechanically or fluidically operated have been described so far, other suitable means for focusing and/or moving the laser beam L relative to the support 10, or vice versa, moving the support 10 relative to the laser beam L, such as a plotter system or systems with multiple scan heads or combined systems known in the art, can be used without however departing from the scope of protection of the present patent.

Similarly, while the use of a central processor 1 capable of controlling both the source 5 of the laser beam L, and the different actuators required for focusing and guiding the laser beam L has been described, the present invention is not limited to the use of a processor, but any other means that is/are suitable to adjust and control the source 5 and actuators 6, 8, such as one or more PLCs can be alternatively used, without departing from the scope of protection of this invention.

Finally, the present invention also extends to apparatuses not only provided with an individual laser beam L, but also provided with a plurality of laser beams L, which act in a concomitant or disjoint manner on the wooden support 10.

The apparatus as described above can be programmed for operation according to one of the possible implementations of the method for transferring images to a wooden support by means of a laser beam L of the present invention.

This method for transferring images I to a wooden support 10 by means of an apparatus provided with a laser source 5, means 6, 7, 8, 9 for focusing and moving the laser beam L relative to the support 10, as well as at least one unit 4 for adjusting the emission of the laser beam L, generally provides the sequential steps of:

- acquiring and/or creating an image I to be transferred to the support 10;
- converting the information of the image I into instructions for adjusting the emission, movement and focusing of the laser beam L relative to said wooden support 10;
- actuating said means 6, 7, 8, 9 for moving and focusing, as well as actuating the adjustment unit 4 for the laser beam 5, according to said instructions, in order to reproduce the image I on the wooden support 10.

This method also provides, as described above, that the adjustment unit 4 can control the emission of the laser beam L by directly adjusting the pumping of the active material of the laser source 5 and/or by adjusting a modulator, which is suitably arranged within the resonant cavity of the source 5.

Figure 2:
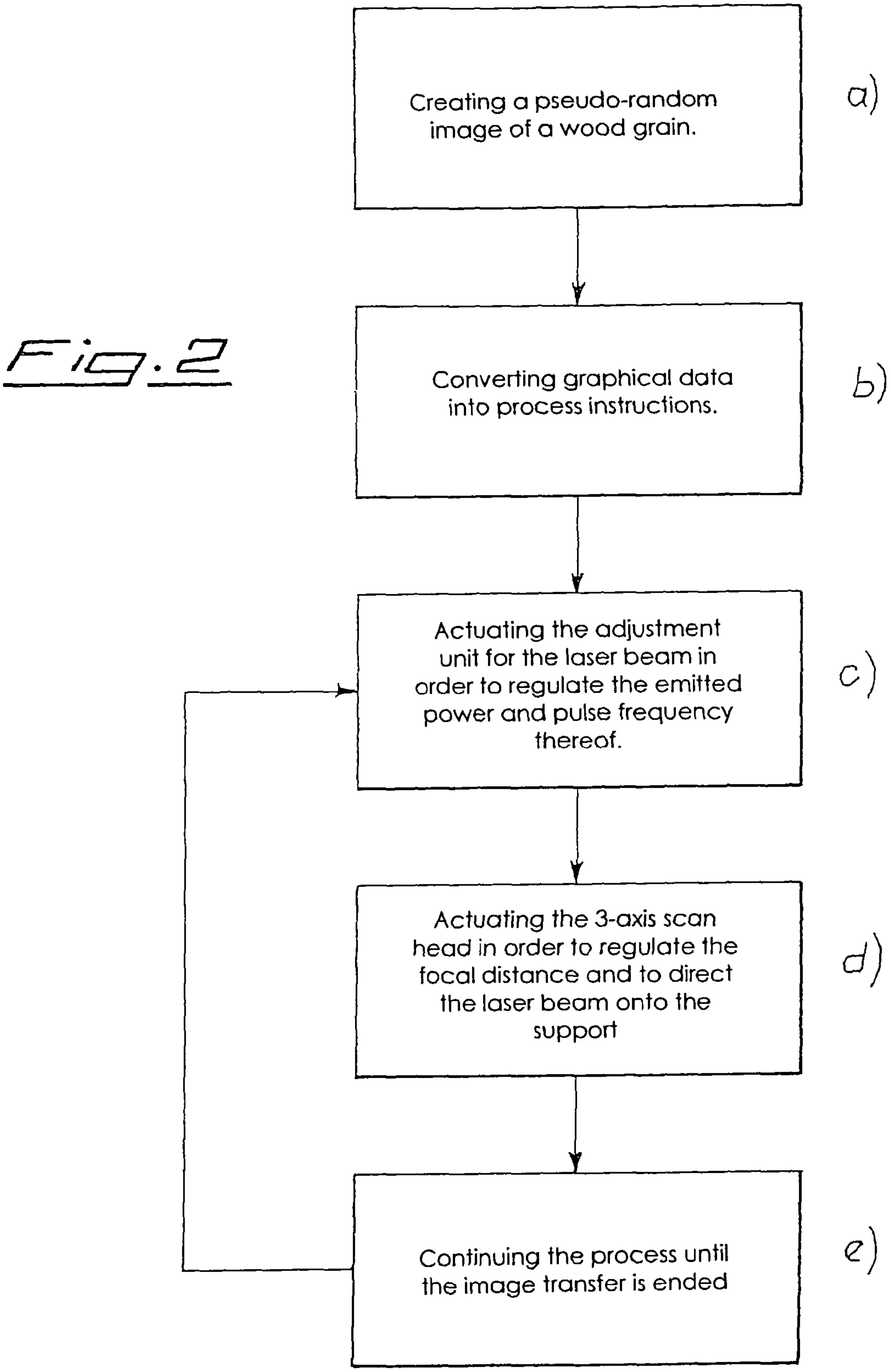
FIG. 2 is a flow diagram of an operating method of the apparatus from FIG. 1.

In greater detail, with reference to the diagram from FIG. 2, a preferred implementation of the method of the present invention relates to transferring an image reproducing wood grains to a wooden support, such as consisting of wooden details for firearms.

According to this preferred implementation of the method of the present invention such as described herein with reference to the layout of the apparatus illustrated in FIG. 1, said step of acquiring and/or creating an image I can be carried out by means of the processor 1, on which a suitable integrated software 3 can be implemented for managing the image I and the operative instructions for the laser source 5, with the adjustment unit 4 therefor, and the means 6, 7, 8, 9 for focusing and guiding the laser beam L emitted from the source 5.

In this case, the image I, either acquired or created, is preferably in digital format, in black and white, or shades of grey.

It should be noted that, due to the preferred method for directly operating the laser beam L on the wooden support 10 as provided by the particular implementation of the method of the present invention as described herein, it would be useless to process and store images I in colours, as these colours could not be reproduced on the support 10. However, the possibility that coloured images I can be transferred to the wooden support 10, such as by using heat- and colour-sensitive substances or other means known in the art, by means of the method of the present invention, cannot be excluded.

A typical operation cycle of the processor 1, implementing a suitable software 3 of the integrated type (acquisition—editing of images (or CAD)—CAE—CAM) may consist of:

a) acquiring a digital image through the scanner 3;
b) editing the image I (such as by applying filters for reducing the noise present in the digital signal and/or by converting the image in 256 shades of grey, etc.);
c) storing the image I in bitmap, or raster format;
d) converting the image I to vectorial format;
e) entering and storing the physical characteristics (geometry, material, etc.) of the wooden support to be worked;
f) reading the vectorial parameters of the image I and converting the same, based on said physical characteristics of the support 10, into: geometric instructions for tracing the contour of the entities reproduced in the image I; functional instructions relating to the emission of the laser beam (emitted power and laser pulse frequency) and to the focusing of the beam on the support, for achieving an optimum cutting, or vaporization or carbonization of a predetermined layer of support 10, and preferably reproducing the shades of grey that may be present in the image I;
g) sending these instructions, both geometrical and functional, to the corresponding adjustment unit 4 for the laser source 5 and control unit 6, 9 for the means for focusing and directing the laser beam L.

When the image I to be transferred consists in a reproduction of wood grains, this reproduction can be obtained by means of a pseudo-random generation of this grain, such as by means of a software that, starting from several preset grain primitives, is capable of providing grains by generating random geometries (such as fractals). In this case, the software may directly generate an image I in vectorial format, which is suitable to be converted in technologic instructions for the laser source 5 and the means 6, 7, 8, 9 for focusing and guiding the laser beam L.

It should be observed that the wood working process by means of a pulsed and suitably modulated laser beam (with a given frequency f) can be modelized as follows, with the proviso that the amount of energy absorbed by the material per surface unit and time unit has to be determined and maintained constant.

Particularly, it is observed that the desired effect is constant when the laser pulses are also distributed on the material surface in a constant manner. The following (approximate) equation thus applies:

$$\frac{E_i}{S} \approx \frac{P}{d \cdot v} = K \tag{1}$$

where $E_i$=energy per individual pulse
P=average power emitted by the source,
d=laser spot diameter on the material,
v=linear speed of the laser on the material, and
S=surface invested by the laser spot ($S=\pi d^2/4$).

The laser power required to obtain a given effect is thus:

$$P \approx \frac{E_i}{\pi \cdot d^2} \cdot 4 \cdot d \cdot v = \frac{4 \cdot E_i}{\pi \cdot d} v \tag{2}$$

Accordingly, the average power, per pulse, of the laser beam L required to obtain a given constant effect on the support 10 is inversely proportional to the spot diameter d and directly proportional to the pulse energy $E_i$ and the processing speed v.

It should be observed, however, that in order to obtain a given effect on the wooden support 10, setting the so-called "space superposition of the multiple pulses, $f_s$" is also decisive, which is defined as follows:

$$f_s = \frac{v}{f \cdot d} \tag{3}$$

where f=repetition frequency of the laser pulses.
$f_s$=is a constant, that can be set for obtaining a determined effect.

Particularly, mainly to prevent undesired removal of material and/or undue extended carbonization of the wood, the Applicant has ascertained that in order to transfer images I, either black and white or in shades of grey, to a wooden support 10, the support 10 has to be ideally subjected to an energy per surface unit value ranging between 2.35 j/cm$^2$ and 43.7 j/cm$^2$ to the purpose of obtaining colour changes to black in the wooden material down to a depth that can reach several tenths of millimeter.

Thereby, as a function of the penetration depth of the image I within the wooden support 10, the shades of grey (or the black and white areas) of the image I to be transferred, and obviously, of the type of wooden material employed, the energy emitted from the laser per cm$^2$ on the wooden support 10 will range from 0 j/cm$^2$ (for transferring a "white" area of the image I) to 43.7 j/cm$^2$ (for transferring a "black" area of the image I down to a depth of several tenths of millimeter).

According to these operating conditions a reduced evaporation of the water molecules contained in the surface layers of the wooden material is obtained, with the consequently reduced removal of material from the support 10 and reduced, if any, carbonization of the support 10. When images I of wood grains are transferred to the wooden support 10, these operating conditions of the laser beam L allow obtaining a very "natural" result on the treated wooden support. After the image I to be reproduced has been acquired or created and the graphic information contained in the image I has been converted into operative instructions for the adjustment unit 4 for the laser source 5 and for the means 6, 7, 8, 9 focusing and guiding the laser beam on the wooden support 10, also based on the above equations and the spatial conformation of the support 10, the particular implementation of the method according to the present invention provides that, under the control of the processor 1 being provided with a suitable software 3, the adjustment unit 4 for the laser source 5, by directly adjusting the pumping of active material or by adjusting an intracavity modulator, allows emitting a laser beam L with suitable power (or intensity) and pulse frequency for either point-by-point or vectorial treatment of the support 10 by the laser beam L. Simultaneously, the processor 1 must control the control units 7, 9 of the focusing and guiding means 6, 8 preferably consisting of a scan head 6 and a piece-holder table 8, such that the laser beam L is directed and focused in order to reproduce, either point-by-point or in a vectorial manner, the image I on the wooden support 10.

Thereby, for each point or vector of the image I to be reproduced, the processor 1 and the adjustment 4 and control 7, 9 units define the intensity (or power), pulse frequency, focal distance of the laser beam L on the support 10 (which defines the laser spot on the surface of the support 10), as well as the position, preferably on three axes, of this spot (or trace) of the laser beam L on the support 10.

The source 5 and the means 6, 7, 8, 9 are obviously operated until the image I has been completely reproduced on the wooden support 10.

Finally, it should be observed that, when required, the wooden support 10 can be treated, before being irradiated with the laser beam L, by means of suitable additives known in the art (see U.S. Pat. No. 4,847,184 for example) either to accelerate or decelerate the carbonization or surface bleaching thereof.

The invention claimed is:

1. A method for transferring images to a wooden support by means of an apparatus provided with at least one source of a laser beam, means for focusing and moving the laser beam relative to the wooden support, as well as at least one adjustment unit for the emission of said laser beam, the method comprising the steps of:

a. at least one of acquiring and creating an image to be transferred;

b. converting information of the image into instructions for adjusting emission, movement and focusing of the laser beam relative to said wooden support;

c. operating said moving and focusing means and said at least one adjustment unit according to said instructions to reproduce said image on said wooden support;

d. said at least one adjustment unit adjusting the emission of said laser beam by directly varying at least one of (1) pumping of active material and (2) varying operation of a modulator placed within a resonant cavity of said at least one source of a laser beam;

e. locally subjecting said wooden support to irradiation by means of said laser beam, with an energy per surface unit ranging from 0 j/cm2 to 43.7 j/cm2, in order to blacken the surface portion of said wooden support being subjected to said local irradiation;

f. said instructions for adjusting the emission, movement, and focusing of the laser beam relative to said wooden support comprising penetrating said laser beam within said wooden support by a thickness ranging from 0.1 and 1 mm; and g. obtaining a reduced evaporation of water molecules contained in surface layers of said wooden support.

2. The method according to claim 1, wherein said image is an image in digital format.

3. The method according to claim 2, wherein said image is in a bitmap, raster, or vectorial format.

4. The method according to claim 2, wherein said image is at least one of acquired and created in black and white or in shades of grey.

5. The method according to claim 1, wherein said image is an image of wood grains.

6. The method according to claim 5, wherein said image of wood grains is obtained by means of random generation.

7. The method according to claim 1, wherein said wooden support is selected from at least one of pistol or carbine grips, rifle butts and forearms.

8. The method according to claim 1, wherein said support is locally subjected to irradiation by means of said laser beam, with an energy per I surface unit ranging from 2.35 j/cm2 to 43.7 j/cm2, in order to blacken the surface portion of the support being subjected to said local irradiation.

9. The method according to claim 1, wherein said wooden support is treated by means of additives for accelerating carbonization and bleaching thereof, prior to said step of operating said moving and focusing means and said at least one adjustment unit according to said instruction for reproducing said image on said wooden support.

10. A method for transferring images to a wooden support by an apparatus provided with at least one source of a laser beam, the method comprising the steps of:

at least one of acquiring and creating an image to be transferred;

editing the image to reduce noise or convert the image in shades of gray;

identifying physical characteristics of the wooden support;

determining geometric instructions for tracing a contour of entities reproduced in the image based on the physical characteristics;

converting information of the image including the geometric instructions into instructions for adjusting emission, movement and focusing of the laser beam relative to said wooden support;

moving, focusing, and adjusting the emission of the laser beam according to said instructions to reproduce said image on said wooden support, wherein the adjusting step comprises:

adjusting the emission of said laser beam by directly varying at least one of (1) pumping of active material and (2) varying operation of a modulator placed within a resonant cavity of said at least one source of a laser beam; and locally subjecting said wooden support to irradiation by said laser beam, with an energy per surface unit ranging from 0 j/cm2 to 43.7 j/cm2, in order to blacken the surface portion of the support being subjected to said local irradiation, wherein the step of locally subjecting said support to irradiation is practiced such that said laser beam penetrates within said wooden support by a thickness ranging from 0.1 and 1 mm, and obtaining a reduced evaporation of water molecules contained in surface layers of the wooden support.

* * * * *

UNITED STATES PATENT AND TRADEMARK OFFICE

CERTIFICATE OF CORRECTION

PATENT NO. : 8,581,142 B2
APPLICATION NO. : 10/579922
DATED : November 12, 2013
INVENTOR(S) : Colico et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this
Twenty-second Day of September, 2015

Michelle K. Lee

Michelle K. Lee
*Director of the United States Patent and Trademark Office*